US008881867B2

(12) United States Patent
Takenawa et al.

(10) Patent No.: US 8,881,867 B2
(45) Date of Patent: Nov. 11, 2014

(54) MOVABLE TYPE LADDER DEVICE FOR WORK VEHICLE

(71) Applicant: Komatsu Ltd., Tokyo (JP)

(72) Inventors: Kenji Takenawa, Hirakata (JP); Hisaaki Furuya, Hirakata (JP); Takashi Moriuchi, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/113,423

(22) PCT Filed: Oct. 9, 2012

(86) PCT No.: PCT/JP2012/076064
§ 371 (c)(1),
(2), (4) Date: Oct. 23, 2013

(87) PCT Pub. No.: WO2013/054777
PCT Pub. Date: Apr. 18, 2013

(65) Prior Publication Data
US 2014/0048352 A1 Feb. 20, 2014

(30) Foreign Application Priority Data

Oct. 13, 2011 (JP) ................................. 2011-225468

(51) Int. Cl.
*E06C 5/00* (2006.01)
*E02F 9/08* (2006.01)
*B60R 3/02* (2006.01)
*E06C 5/04* (2006.01)
*E02F 9/22* (2006.01)

(52) U.S. Cl.
CPC ................. *E02F 9/0833* (2013.01); *B60R 3/02* (2013.01); *E06C 5/04* (2013.01); *E02F 9/2271* (2013.01); *E02F 9/2275* (2013.01)
USPC ....................................................... 182/127

(58) Field of Classification Search
CPC ........................................................ E06C 5/04
USPC ............. 182/127, 85, 86, 18; 280/163, 164.1, 280/166; 296/62
See application file for complete search history.

(56) References Cited

U.S. PATENT DOCUMENTS 3,190,392 A * 6/1965 Ashton et al. ................... 182/97
3,656,578 A 4/1972 Hemken
(Continued)

FOREIGN PATENT DOCUMENTS

AU          713990 B2    12/1999
JP    2009-517265 A    4/2009

OTHER PUBLICATIONS

International Search Report for PCT/JP2012/076064, issued on Dec. 11, 2012.

*Primary Examiner* — Charles A Fox
*Assistant Examiner* — Kristine Florio
(74) *Attorney, Agent, or Firm* — Global IP Counselors, LLP (57) ABSTRACT

A movable type ladder device for a work vehicle includes a ladder main body, a drive mechanism, and an up-and-down lock mechanism. The ladder main body has first and second end portions in a longitudinal direction thereof with the first end portion being rotatably supported with respect to the vehicle body. The drive mechanism is configured to move the ladder main body between a boarding posture and a retracted posture by rotating the ladder main body at an angle of 90 degrees. The up-and-down lock mechanism is configured to restrict the ladder main body set in the retracted posture from moving in an up-and-down direction. The rotational center axis is disposed perpendicularly to the longitudinal direction of the ladder main body set in the boarding posture in a front view, and perpendicularly to the longitudinal direction of the ladder main body set in the retracted posture in a plan view.

6 Claims, 8 Drawing Sheets

(56) References Cited

U.S. PATENT DOCUMENTS

| | | | |
|---|---|---|---|
| 5,988,316 A * | 11/1999 | Hedley | 182/127 |
| 6,029,775 A * | 2/2000 | Hedley et al. | 182/127 |
| 6,264,222 B1 * | 7/2001 | Johnston et al. | 280/166 |
| 7,857,337 B2 * | 12/2010 | Ferguson et al. | 280/166 |
| 7,870,932 B2 | 1/2011 | Lapke et al. | |
| 8,186,763 B2 * | 5/2012 | Kramer et al. | 299/39.4 |
| 8,251,178 B2 * | 8/2012 | Krobot | 182/88 |
| 2006/0070804 A1 * | 4/2006 | Lapke et al. | 182/127 |
| 2009/0065301 A1 * | 3/2009 | Ellement | 182/127 |
| 2010/0090517 A1 * | 4/2010 | Kramer et al. | 299/36.1 |

\* cited by examiner

MOVABLE TYPE LADDER DEVICE FOR WORK VEHICLE

CROSS-REFERENCE TO RELATED APPLICATIONS

This application is a U.S. National stage application of International Application No. PCT/JP2012/076064, filed on Oct. 9, 2012. This U.S. National stage application claims priority under 35 U.S.C. §119(a) to Japanese Patent Application No. 2011-225468, filed in Japan on Oct. 13, 2011, the entire contents of which are hereby incorporated herein by reference.

BACKGROUND

1. Field of the Invention

The present invention relates to a ladder device, particularly to a ladder device for climbing up to and climbing down from a walkway mounted on a vehicle body of a construction machinery.

2. Background Information

In work vehicles such as large bulldozers and wheel loaders, a cab and a walkway serving as a communication path to the cab are disposed in a higher position. Further, a ladder device is mounted for climbing up to and climbing down from the cab through the walkway. Ladder devices, having been proposed so far, are of a stationary type fixed to a vehicle-side member and of a movable type configured to be moved between a boarding posture and a retracted posture. The movable type ladder device is configured to be disposed between the ground and the walkway in the boarding posture while deployed. On the other hand, the movable type ladder device is configured to be retracted to a lateral part of a vehicle body so as to be oriented in a substantially horizontal direction in the retracted posture.

For example, a movable type ladder device described in Australia Patent No. 713990 is provided with a first axis in the horizontal direction and a second axis perpendicular to the first axis. Further, the upper end portion of a ladder main body is supported rotatably about these axes. In this device, the ladder main body, set in the boarding posture, is firstly rotated about the first axis and is accordingly lifted upwards, and is then stopped in an upper position beyond the retracted posture. Next, the lifted ladder main body is rotated about the second axis and is accordingly pulled towards the vehicle body. Then, the ladder main body is further rotated about the first axis and is accordingly moved downwards. Thus, the ladder main body is set in the retracted posture.

On the other hand, a movable type ladder device described in U.S. Pat. No. 7,870,932 is provided with a single axis that the upper side thereof is forwardly slanted in a vehicle side view, and the upper part of the ladder main body is rotatably supported by the slanted axis. In this device, the ladder main body, set in the boarding posture, is rotated about the slanted axis, and is set in the retracted posture. In the retracted state, the ladder main body is disposed along the vehicle body in such a posture that the vehicle-body-side (back side) surface thereof is oriented outwards.

SUMMARY

In the ladder device of Publication of Australia Patent No. 713990, the two axes are provided, and further, two actuators are provided for rotating the ladder main body about these axes. Therefore, the structure thereof is complicated, and in addition, the cost thereof is increased.

On the other hand, in the ladder device of U.S. Pat. No. 7,870,932, the ladder main body can be moved between the boarding posture and the retracted posture with use of the single axis and the single actuator. However, in the ladder device, the ground-side end portion thereof is supposed to be rotated farther away from the vehicle body during rotation of the ladder main body. Specifically, the ground-side end portion of the ladder main body is rotated away from the vehicle body by a radius roughly equal to the distance to the slanted axis as the rotational center. Therefore, the ladder main body cannot be rotated when an obstacle exists in the surrounding of the vehicle.

It is an object of the present invention to enable the ladder main body to be moved between the boarding posture and the retracted posture in a compact actuation range with a simple structure.

Now, to simplify the structure of the ladder device, it can be assumed that only the horizontal axis is employed by removing the other of the two axes described in Australia Patent No. 713990. However, when the ladder main body is set in the boarding posture and is thereby in a deployed state, the ground-side end portion thereof is separated away from the vehicle body. Therefore, when the ladder main body in the deployed state is rotated only about the horizontal axis, the ground-side end portion of the ladder main body is kept away from the vehicle body in the retracted state.

In view of the above, it is required to satisfy the following two conditions in rotating the ladder main body about a single rotational center axis:

(1) The ladder main body is not separated farther away from the vehicle body when being rotated between the boarding posture and the retracted posture; and (2) The ladder main body is entirely disposed along and adjacently to the vehicle body when being rotated and set in the retracted state.

The inventors of the present application found that the single rotational center axis, satisfying the aforementioned conditions, is an axis that is arranged substantially perpendicular to the extended direction of the ladder main body set in the boarding posture and is extended in the back-and-forth direction of the vehicle, i.e., an axis arranged substantially perpendicular to the extended direction of the ladder main body set in the retracted posture.

A movable type ladder device for a work vehicle according to a first aspect of the present invention has been produced in view of the aforementioned situation. The movable type ladder device is a device for climbing up to and climbing down from a cab mounted to a vehicle body of the work vehicle, and includes a movable type ladder main body, a drive mechanism and an up-and-down lock device. The movable type ladder main body has a first end portion and a second end portion in a longitudinal direction thereof The first end portion is rotatably supported with respect to the vehicle body. The ladder main body is allowed to be set in: a boarding posture that causes the ladder main body to be slanted with respect to a horizontal surface while the second end portion is positioned on a ground side; and a retracted posture that causes the second end portion to be lifted up to the same height as the first end portion. The drive mechanism is supported by the vehicle body, and is configured to move the ladder main body between the boarding posture and the retracted posture by rotating the ladder main body at an angle of 90 degrees. The up-and-down lock mechanism is configured to restrict the ladder main body set in the retracted posture from moving in an up-and-down direction with respect to the vehicle body. Further, a rotational center axis of the ladder main body is disposed perpendicularly to the longitudinal direction of the ladder main body set in the boarding posture in a front view, and is also disposed perpendicularly to the longitudinal direction of the ladder main body set in the retracted posture in a plan view.

It should be noted that the phrase "in a front view" refers to a situation that the ladder device is seen from ahead of the work vehicle while being attached to the work vehicle, whereas the phrase "in a plan view" refers to a situation that the ladder device is seen from above of the work vehicle while being attached to the work vehicle.

In the present device, the ladder main body is configured to be moved between the boarding posture and the retracted posture when being rotated about the single rotational center axis that is perpendicular to the ladder main body set in the boarding posture and is also perpendicular to the ladder main body set in the retracted posture. Here, the ladder main body is not separated farther away from the vehicle body when being rotated between the boarding posture and the retracted posture. Further, when being rotated from the boarding posture at an angle of 90 degrees, the ladder main body can be retracted while being disposed along and adjacently to the vehicle body.

When such single rotational center axis is set as described above, it is herein similarly required to accurately dispose the drive mechanism for rotating the ladder main body about the rotational center axis and the mechanism for restricting vibration and moving of the ladder main body set in the retracted posture, respectively in accordance with the arrangement of the single rotational center axis. Further, it is required to variously change the position and the angle of the single rotational center axis in accordance with the arrangement of the drive unit of the work vehicle and so forth.

However, it is difficult to accurately dispose all the other mechanisms in accordance with the arrangement (position, angle, etc.) of the single rotational center axis. Further, it is complicated to change the arrangement of the single rotational center axis and the arrangements of the other mechanisms in accordance with a specification of the work vehicle. It is also difficult to adjust the mutual positional relation.

In view of the above, a movable type ladder device for a work vehicle according to a second aspect of the present invention relates to the device according to the first aspect, and further includes a mount frame to be attached to the vehicle body. Further, the ladder main body, the drive mechanism and the up-and-down lock mechanism are mounted onto the vehicle body, while being supported by the mount frame.

In the present device, all the component elements comprising the ladder device are mounted onto the single mount frame. Therefore, all the component elements are supposed to be disposed with reference to the mount frame. Hence, the respective component elements can be easily and accurately disposed in comparison with the case that the respective component elements are separately attached to the vehicle body. Further, the ladder main body and the other component members can be easily disposed in an appropriate positional relation on a variety of vehicles by arbitrarily setting the attached position and the attached angle of the mount frame with respect to the vehicle body.

A movable type ladder device for a work vehicle according to a third aspect of the present invention relates to the device according to the first or second aspect, and wherein the ladder main body has: a pair of side plates disposed at a predetermined interval; and a plurality of steps disposed between the pair of side plates. Further, the rotational center axis is positioned further lower than a lower-side one of the side plates in the retracted posture.

Here, the ladder main body set in the retracted posture is disposed above the rotational center axis. Therefore, it becomes easy for the ladder main body to avoid interference with the drive unit such as a crawler belt.

A movable type ladder device for a work vehicle according to a fourth aspect of the present invention relates to the device according to the second or third aspect, and wherein the up-and-down lock mechanism includes a rod, a latch, a retracted posture detection sensor and a latch drive unit. The rod is mounted to the ladder main body and is protruded towards the mount frame. The latch is mounted to the mount frame, and is allowed to be set in: an engaged position that causes the latch to be engaged with the rod; and a disengaged position that causes the latch to be disengaged from the rod. The retracted posture detection sensor detects that the ladder main body has been set in the retracted posture. The latch drive unit is mounted to the mount frame, and is configured to move the latch between the engaged position and the disengaged position in accordance with a detection result of the retracted posture detection sensor.

When the ladder main body is herein moved to the retracted posture, the latch mounted to the mount frame is driven and is engaged with the rod mounted to the ladder main body. Accordingly, the ladder main body set in the retracted posture is restricted from moving up and down. Further, the rod is fixed to the ladder main body supported by the mount frame, whereas the latch and the latch drive unit are mounted to the mount frame. In other words, the rod and the latch that are engaged with each other and the drive unit thereof are attached with reference to the mount frame. Therefore, the mutual positional relation thereof can be easily and accurately adjusted.

A movable type ladder device for a work vehicle according to a fifth aspect of the present invention relates to the device according to the fourth aspect, and wherein the rod is positioned at the same height as the rotational center axis.

With such positional relation, the ladder main body can be set in a roughly horizontal state when the up-and-down lock mechanism is actuated while the ladder main body is retracted.

A movable type ladder device for a work vehicle according to a sixth aspect of the present invention relates to the device according to any of the second to fifth aspects, and further includes a right-and-left lock mechanism configured to restrict the ladder main body set in the retracted posture from moving in a right-and-left direction with respect to the mount frame.

Here, the ladder main body set in the retracted posture is restricted from moving in the right-and-left direction by the right-and-left lock mechanism. Therefore, the retracted ladder main body can be prevented from colliding with the vehicle body due to vibration and so forth.

A movable type ladder device for a work vehicle according to a seventh aspect of the present invention relates to the device according to the sixth aspect, and wherein the right-and-left lock device includes a protruded member and a restriction member. The protruded member is mounted to the ladder main body and is protruded upwards from the ladder main body set in the retracted posture. The restriction member is mounted to the mount frame, and is configured to receive insertion of the protruded member and restrict the protruded part from moving in the right-and-left direction when the ladder main body is set in the retracted posture.

Here, only by moving the ladder main body from the boarding posture to the retracted posture, the protruded member of the ladder main body is inserted into the restriction member on the mount-frame side, and thereby, the ladder main body can be restricted from moving in the right-and-left direction.

A movable type ladder device for a work vehicle according to an eighth aspect of the present invention relates to the device according to the seventh aspect, and wherein the rod of the up-and-down lock mechanism is fixed to a lower-side one of the side plates of the ladder main body set in the retracted posture, whereas The protruded member of the right-and-left lock mechanism is fixed to an upper-side one of the side plates of the ladder main body set in the retracted posture.

According to the present invention as described above, the ladder main body can be moved between the boarding posture and the retracted posture in a compact actuation range with a simple structure.

DESCRIPTION OF THE EMBODIMENTS

Overall Structure

Figure 1:
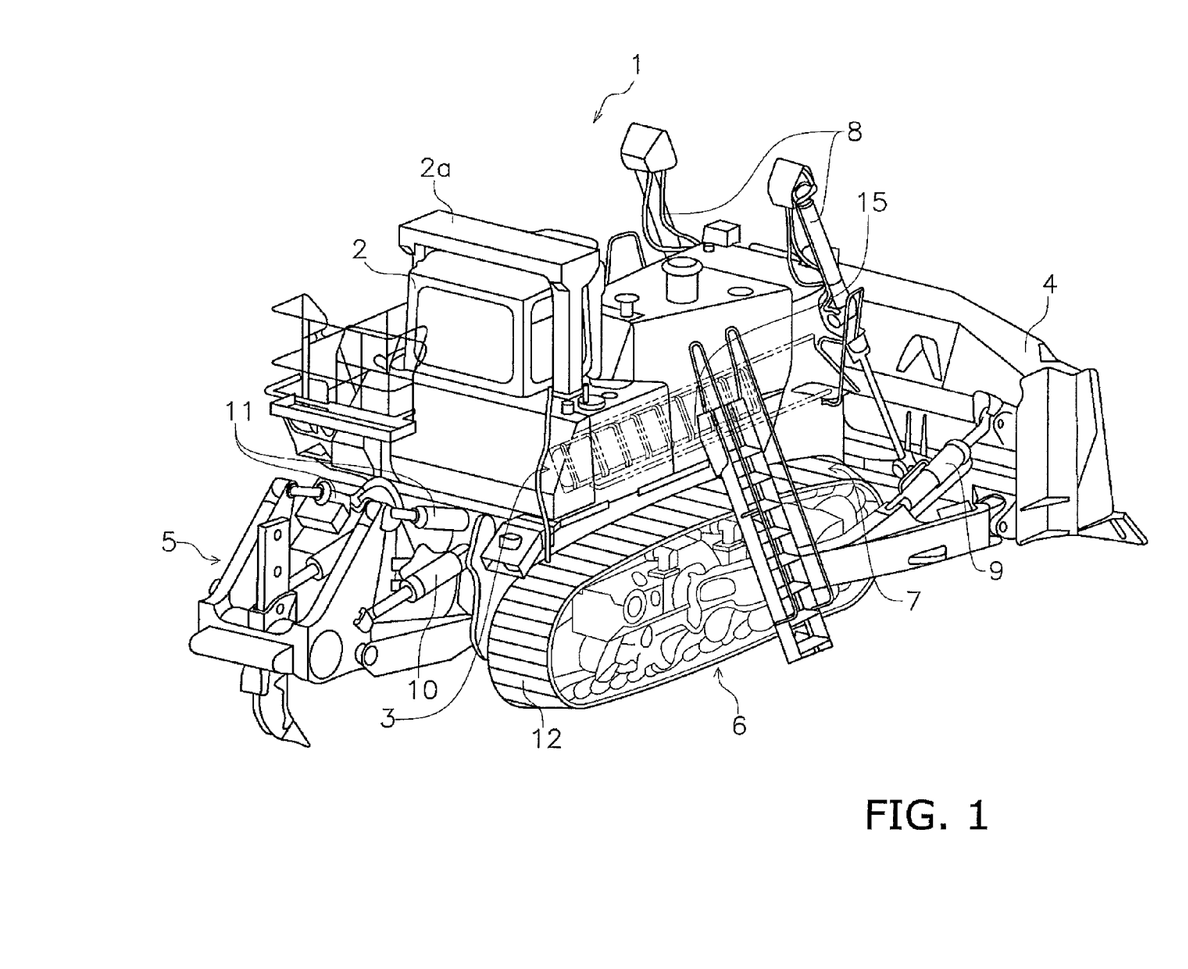
FIG. 1 is an external perspective view of a bulldozer equipped with a ladder device according to an exemplary embodiment of the present invention.

FIG. 1 illustrates a bulldozer equipped with a movable type ladder device according to an exemplary embodiment of the present invention. The bulldozer 1 mainly includes a cab 2, an ROPS (Roll Over Protective Structure) 2a, a vehicle body frame 3, a blade 4, a ripper device 5 and a drive unit 6. Further, the bulldozer 1 is equipped with a movable type ladder device (hereinafter simply referred to as "a ladder device") 7 on a right lateral part of the vehicle body frame 3.

An operator seat, levers for a variety of operations, pedals, meters and so forth are installed inside the cab 2. Further, an operating button (see FIG. 8) is disposed inside the cab 2 in order to move the ladder device 7 to a boarding posture and a retracted posture. An engine and a variety of devices, which are not illustrated in the figures, are mounted to the vehicle body frame 3 and are covered with an external cover. The blade 4 is disposed forwards of the vehicle body frame 3, and is configured to be driven by blade lift cylinders 8 and blade tilt cylinders 9. The ripper device 5 is disposed rearwards of the vehicle body frame 3, and is configured to be driven by ripper lift cylinders 10 and ripper tilt cylinders 11. The drive unit 6 includes a pair of endless crawler belts 12 respectively mounted to the right and left lower parts of the vehicle body frame 3.

Ladder Device

Figure 2:
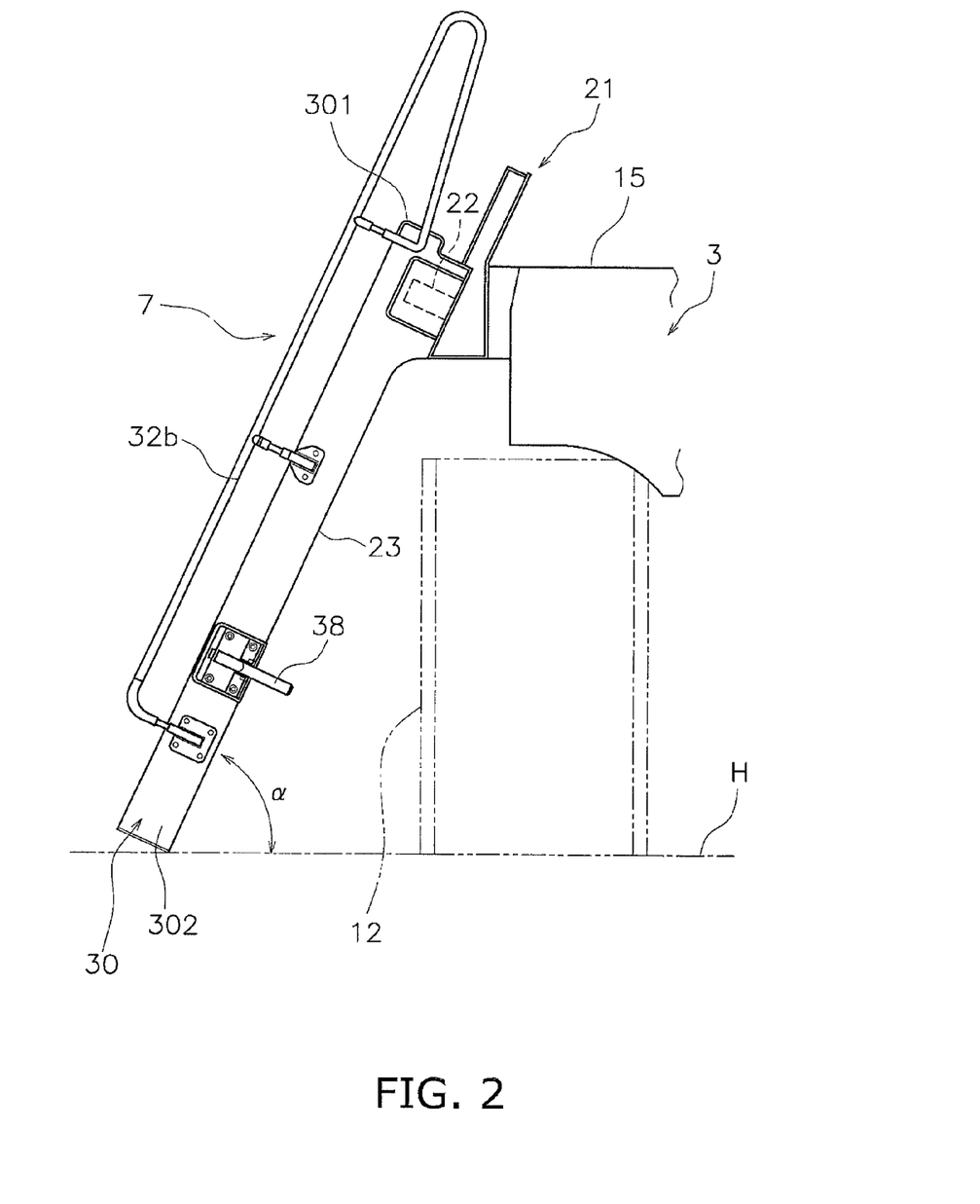
FIG. 2 is a diagram illustrating arrangements of the ladder device, a crawler belt and a walkway.

The ladder device 7 is provided for allowing an operator to climb up to or climb down from a walkway 15 disposed on the vehicle body frame 3. FIG. 1 depicts a position while deployed (a boarding posture) with a solid line, while depicting a position while retracted (a retracted posture) with a dashed two-dotted line. Further, FIG. 2 schematically illustrates a positional relation between the ladder device 7 while deployed and both of the vehicle body frame 3 and the crawler belt 12. As illustrated in FIG. 2, the drive unit 6 is mounted to the vehicle body frame 3, while being protruded right and left therefrom. Therefore, the ladder device 7 set in the boarding posture is disposed in such a slanted state to form an angle α less than 90 degrees with respect to a horizontal plane H. As depicted with the dashed two-dotted line in FIG. 1, the ladder device 7 set in the retracted posture is disposed in a roughly horizontal orientation along the back-and-forth direction of the vehicle body frame 3.

Figure 3:
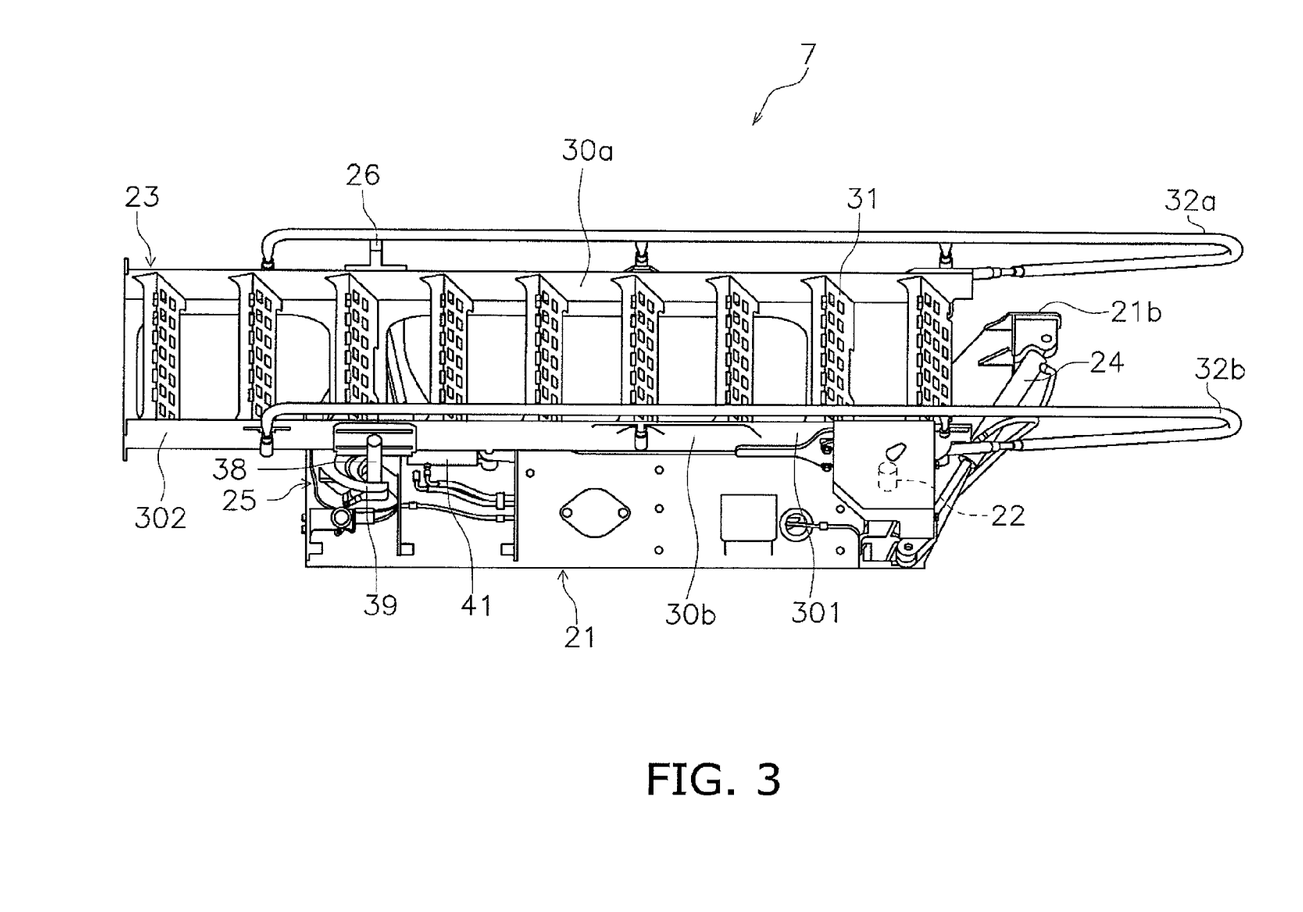
FIG. 3 is an external view of the ladder device in a retracted state.
Figure 4:
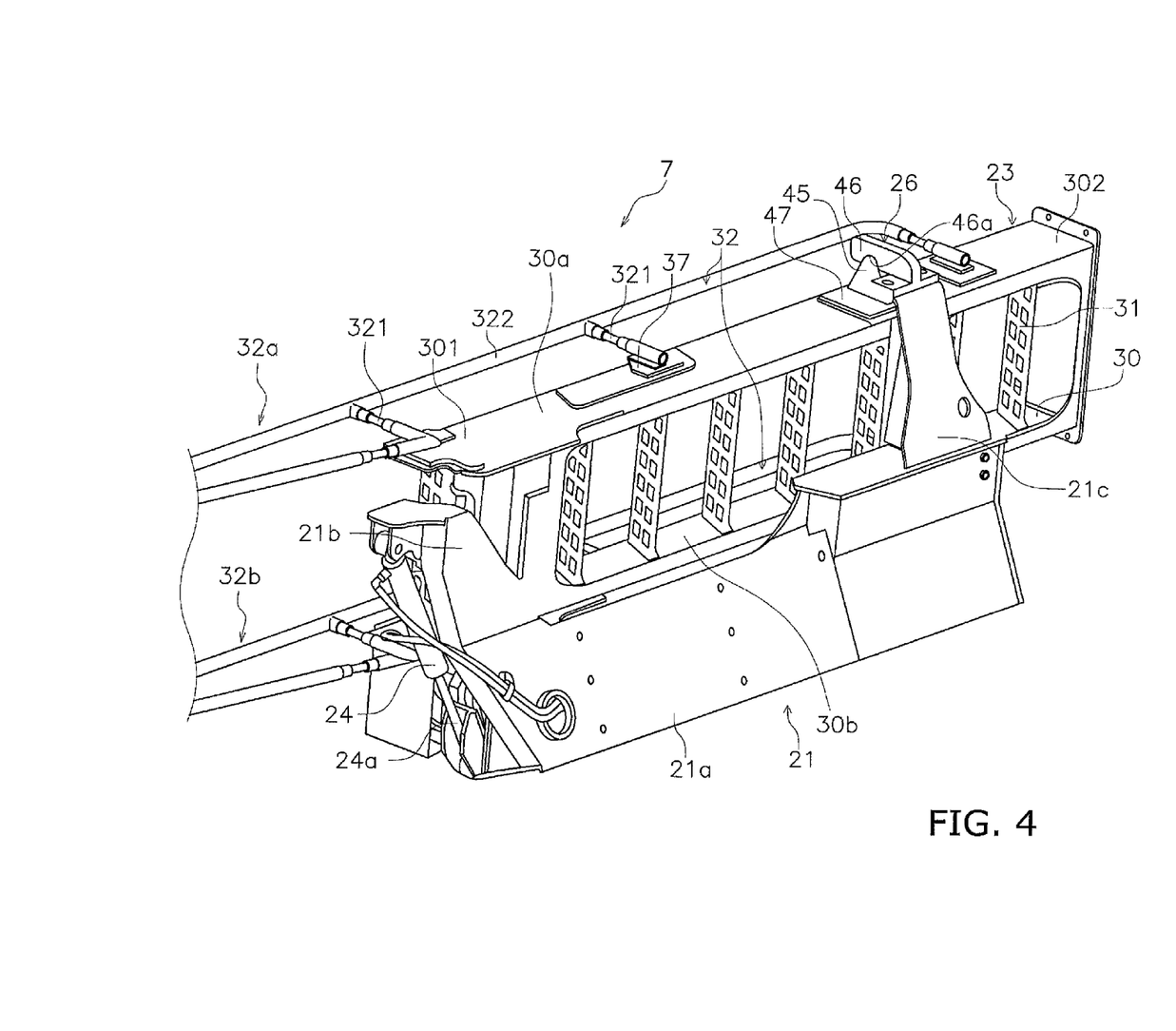
FIG. 4 is a rear side view of the ladder device of FIG. 3.

Drawings of FIG. 3 and thereafter illustrate the ladder device 7 detached from the vehicle body frame 3. As illustrated in the drawings, the ladder device 7 includes: a mount frame 21 mounted to the vehicle body frame 3; a pin 22 having a rotational center axis in the center thereof; a ladder main body 23; a first hydraulic cylinder 24; an up-and-down lock mechanism 25; and a right-and-left lock mechanism 26. It should be noted that FIGS. 3 and 4 illustrate the ladder device 7 set in the retracted state. FIG. 3 is a diagram of the ladder device 7 seen from a lateral side of the vehicle, whereas FIG. 4 is a diagram of the ladder device 7 seen from a side to be attached to the vehicle body frame 3.

Figure 5:
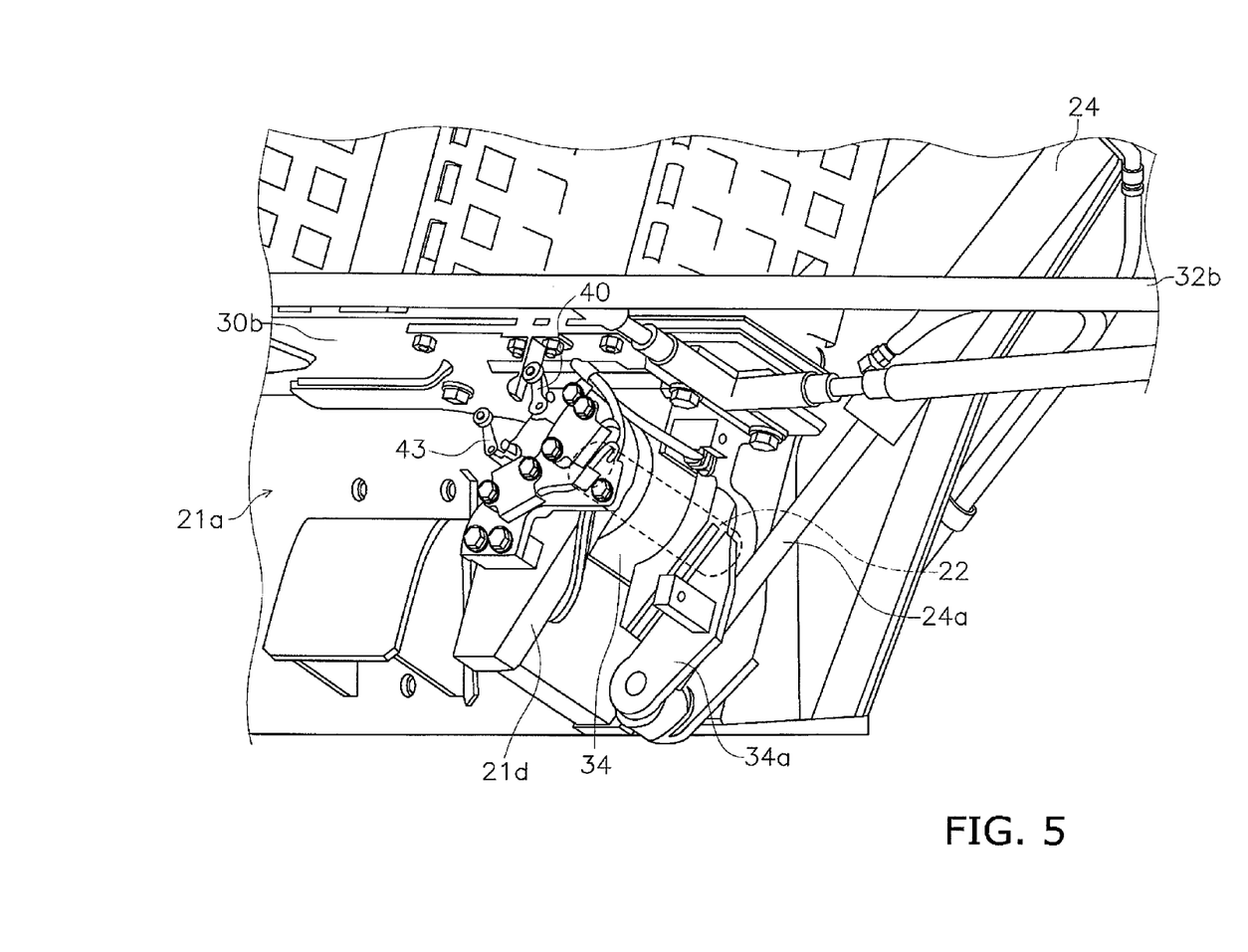
FIG. 5 is a partial enlarged view of FIG. 3.

As illustrated in FIGS. 3 and 4, the mount frame 21 is a member extended in the back-and-forth direction of the vehicle and has: a fixation portion 21a to be fixed to the vehicle body frame 3; a front support portion 21b upwardly extended from the front end of the fixation portion 21a; and a rear support portion 21c upwardly extended from the rear end of the fixation portion 21a. Further, as illustrated in FIG. 5, a support bracket 21d is fixed to the front end of the fixation portion 21a. The support bracket 21d is formed in a U-shape in a front view (seen from ahead). It should be noted that in FIG. 5, a part of the support bracket 21d is positioned on the back side of a coupling portion 34a and so forth, and is therefore not illustrated therein. Further, a rotary bracket 34 (to be described) of the ladder main body 23 is inserted into a recessed portion of the support bracket 21d. The fixation portion 21a of the mount frame 21 is fixed to the vehicle right lateral part of the vehicle body frame 3 by means of a plurality of bolts.

Figure 6:
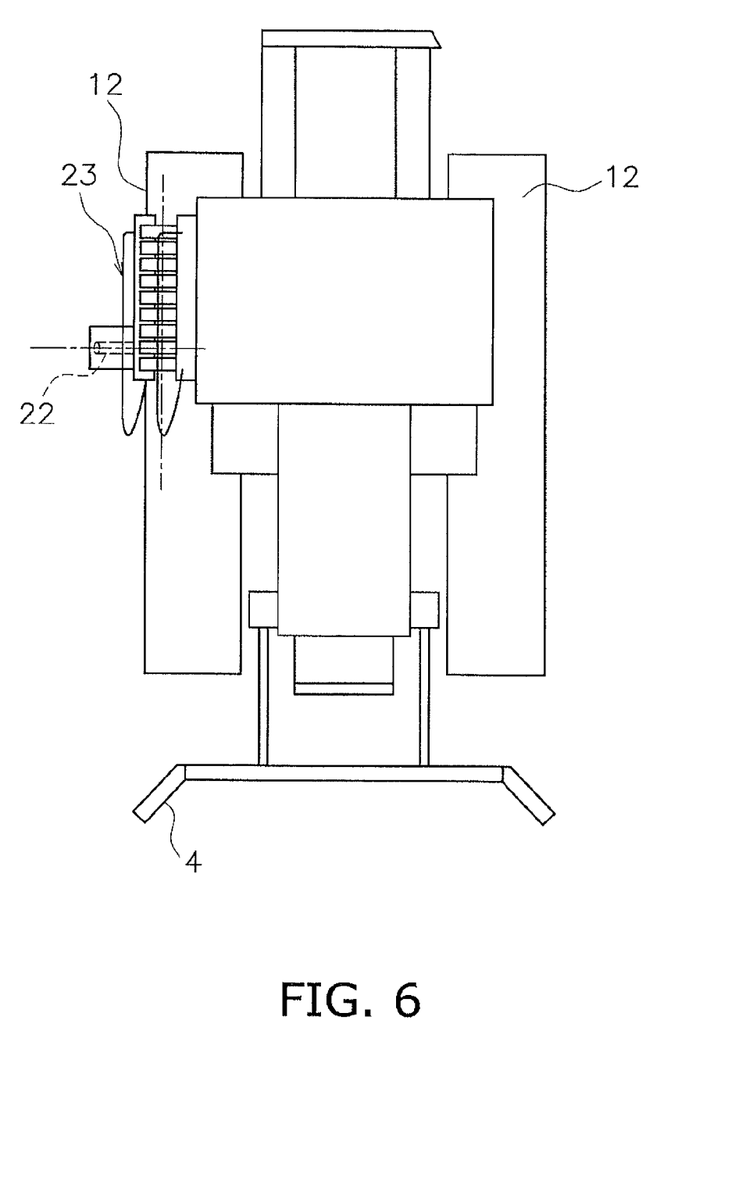
FIG. 6 is a schematic plan view of the bulldozer.

As illustrated in FIG. 5, the pin 22 is mounted while penetrating through the support bracket 21d and the rotary bracket 34 (to be described). The pin 22 is disposed lower than the walkway 15 and higher than the crawler belt 12, while being disposed lower than the ladder main body 23 set in the retracted posture. Further, as illustrated in FIGS. 2 and 6, the pin 22 is disposed substantially perpendicular to a direction extended in the longitudinal direction of the ladder main body 23 set in the boarding posture, i.e., substantially perpendicular to the surface of the front support portion 21b of the mount frame 21 in a front view seen from ahead of the vehicle. Besides, the pin 22 is disposed substantially perpendicular to a direction extended in the longitudinal direction of the ladder main body 23 set in the retracted posture oriented along the back-and-forth direction of the vehicle body frame 3 in a plan view seen from above of the vehicle. When set in the boarding posture, the ladder main body 23 makes contact with the horizontal plane H, while being slanted at the angle α with respect to the horizontal plane H on the vehicle-body-frame-3 side. In other words, in a front view illustrated in FIG. 2, the rotational center axis of the pin 22 is upwardly slanted at an angle of (90-α) with respect to the horizontal plane H, while being gradually separated away from the horizontal plane H in proportion to distance from the mount frame 21. In a plan view of FIG. 6, the rotational center axis of the pin 22 is arranged perpendicularly to the back-and-forth direction of the vehicle body frame 3 in a plan view illustrated in FIG. 6.

As illustrated in FIGS. 3 to 5, the ladder main body 23 includes: left and right side plates 30a and 30b disposed at a predetermined interval; a plurality of steps 31 disposed between the left and right side plates 30a and 30b; and left and right banisters 32a and 32b respectively fixed to the outer surfaces of the left and right side plates 30a and 30b.

Each of the left and right side plates 30a and 30b has: a first end portion 301 to be disposed on the walkway-15 side when the ladder main body 23 is set in the boarding posture; and a second end portion 302 to be disposed on the ground side when the ladder main body 23 is set in the boarding posture. Further, in a front view, the vehicle-body-frame-3 side surface of the second end portion 302 is slanted at the angle α with respect to the horizontal plane H in the boarding posture. As illustrated in an enlarged view of FIG. 5, the rotary bracket 34 is fixed to the outer surface of the right side plate 30b, and as described above, the pin 22 is rotatably inserted into the center part of the rotary bracket 34. Thus, the ladder main body 23 is entirely rotatable about the pin 22 due to the structure that the rotary bracket 34 fixed to the right side plate 30b is rotatably supported by the pin 22. Further, the rotary bracket 34 is provided with the coupling portion 34a protruded in a direction away from the right side plate 30b.

The left and right banisters 32a and 32b are similarly structured, and as illustrated in FIG. 4, each has: a plurality of vertical members 321 fixed at their bottom end portions to the outer surface of each side plate 30a, 30b through attachment portions 37; and a banister main body 322 disposed for coupling the upper ends of the plural vertical members 321. The banister main body 322 is disposed in parallel to each side plate 30a, 30b.

As illustrated in FIGS. 3 and 4, the base end portion of the first hydraulic cylinder 24 is rotatably supported by the front support portion 21b of the mount frame 21. Further, as illustrated in FIG. 5, the tip end of a piston rod 24a of the first hydraulic cylinder 24 is rotatably coupled through a pin to the coupling portion 34a formed in the rotary bracket 34 on the right side plate 30b. Therefore, when the piston rod 24a of the first hydraulic cylinder 24 is actuated, the rotary bracket 34 is rotated, and as a result, the ladder main body 23 is configured to be rotated about the pin 22. The aforementioned structure is a drive mechanism for moving the ladder main body 23 between the retracted posture and the boarding posture.

As illustrated in FIG. 3, the up-and-down lock mechanism 25 includes: a rod 38 mounted to the ladder-main-body-23 side; a latch 39 mounted to the mount-frame-21 side; a retracted posture detection sensor 40 (see FIG. 8); and a second hydraulic cylinder 41 for driving the latch 39.

The rod 38 is a columnar member fixed to the lower end portion of the outer surface of the right side plate 30b composing a part of the ladder main body 23. The lower end of the rod 38 is further protruded towards the mount frame 21 beyond the lower surface of the right side plate 30b. The center axis of the rod 38 is arranged in parallel to the rotational center axis of the pin 22. The pin 22, functioning as the rotational center of the ladder main body 23, is positioned as described above. Therefore, the rod 38, disposed away from the vehicle body frame 3 in the boarding posture, is disposed closer to the vehicle body frame 3 in the retracted posture only by rotating the ladder main body 23 at an angle of 90 degrees.

Figure 7:
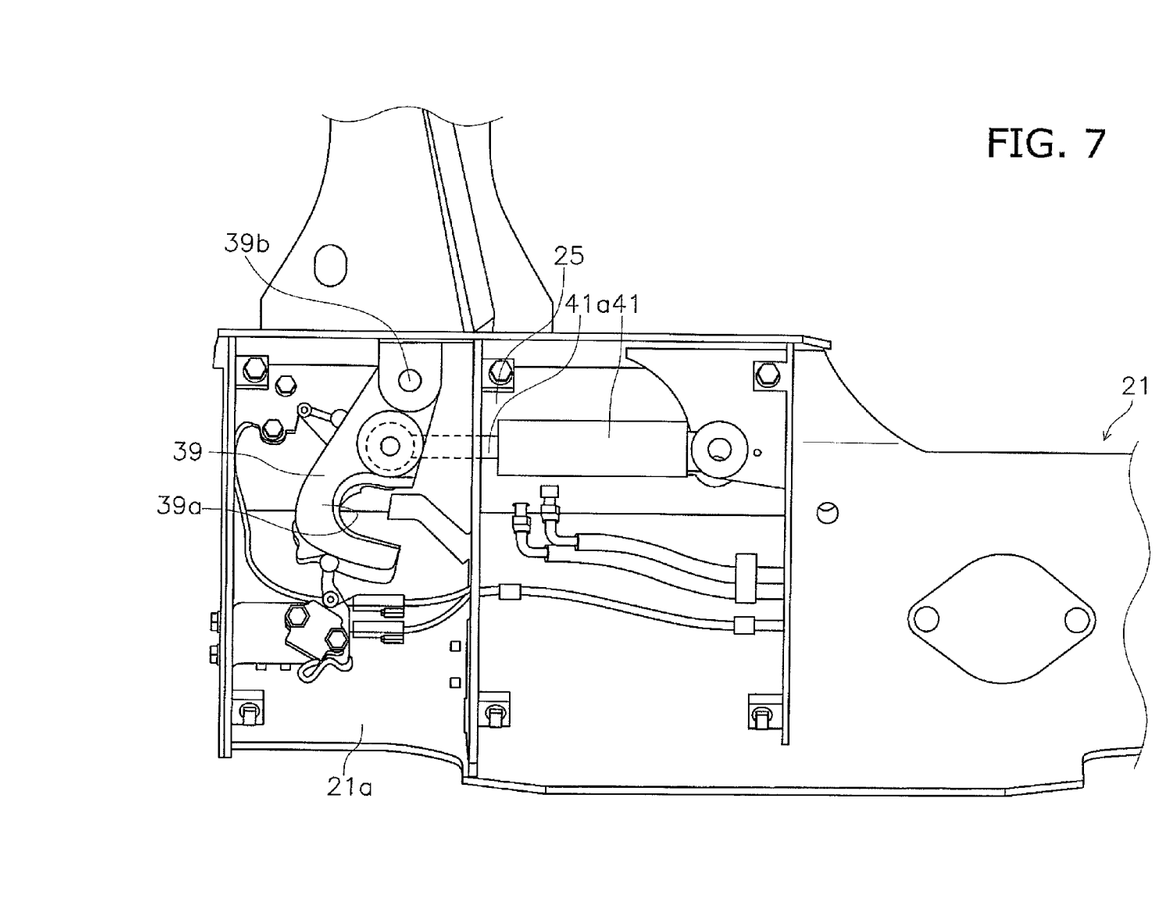
FIG. 7 is an external view of a structure of an up-and-down lock mechanism.

As illustrated in FIG. 7, the latch 39 is mounted to the rear end portion of the fixation portion 21a of the mount frame 21. The latch 39 is composed of two plate members disposed away from each other at an interval, and is formed in a C-shape having a recessed portion 39a on one side thereof.

The base end portion 39b of the latch 39 is rotatably supported by the mount frame 21, and the rod 38 can be inserted into the recessed portion 39a.

The retracted posture detection sensor 40 is mounted to the support bracket 21d of the mount frame 21. The retracted posture detection sensor 40 is a sensor for detecting that the ladder main body 23 set in the boarding posture has reached the position corresponding to the retracted posture as a result of rotation. On the other hand, a boarding posture detection sensor 43 (see FIG. 5) is mounted to the rotary bracket 34 in order to detect that the ladder main body 23 set in the retracted posture has reached the position corresponding to the boarding posture as a result of rotation. Roller arm limit switches are used as both of the retracted posture detection sensor 40 and the boarding posture detection sensor 43.

As illustrated in FIG. 7, a base end portion of the second hydraulic cylinder 41 is rotatably supported by the fixation portion 21a of the mount frame 21. The tip end of a piston rod 41a of the second hydraulic cylinder 41 is rotatably coupled to the two plate members comprising the latch 39, while being inserted between the two plate members in a position between the recessed portion 39a and the base end portion 39b.

In the structure as described above, when the piston rod 41a of the second hydraulic cylinder 41 is actuated, the latch 39 can be set in either an engaged position of causing the latch 39 to be engaged with the rod 38 of the ladder main body 23 set in the retracted posture or a disengaged position of causing the latch 39 to be disengaged from the rod 38. In the engaged position, the ladder main body 23 set in the retracted posture is restricted from moving in the up-and-down direction.

The right-and-left lock mechanism 26 is a mechanism for restricting the ladder main body 23 set in the retracted posture from moving in the right-and-left direction. As illustrated in FIG. 4, the right-and-left lock mechanism 26 includes: a protruded part 45 mounted to the ladder main body 23; and a restriction member 46 mounted to the mount frame 21.

The protruded part 45 is mounted to the lower end portion of the outer surface of the left side plate 30a. The protruded part 45 is a triangular plate member that one apex thereof is formed in a circular-arc shape in a view along the extended direction of the left side plate 30a. The protruded part 45 is fixed to the left side plate 30a together with a base plate 47.

The restriction member 46 is fixed to the upper end of the rear support portion 21c of the mount frame 21. The restriction member 46 is disposed while being extended from the upper end of the rear support portion 21c to the outward of the vehicle. The restriction member 46 has a recessed portion 46a on the lower surface thereof such that the tip end of the protruded part 45 can be inserted therein.

With the structure as described above, the tip end of the protruded part 45 is configured to be inserted into the recessed portion 46a of the restriction member 46 when the ladder main body 23 is rotated and set in the retracted posture. Accordingly, the ladder main body 23 set in the retracted posture is restricted from moving in the right-and-left direction.

Further, all the component members, comprising the ladder device 7, are mounted onto the single mount frame 21. Therefore, the respective members can be easily and accurately disposed. Specifically, the ladder-main-body-23 side members and the mount-frame-21-side members, comprising the up-and-down lock mechanism 25 and the right-and-left lock mechanism 26, are disposed with reference to the mount frame 21. Therefore, the mutual positional relation among these members can be easily and accurately adjusted.

Further, the ladder device 7 can be easily fitted to a variety of vehicles by suitably setting the attachment position and the attachment angle of the mount frame 21 to the vehicle body frame on an as-needed basis.

Control Block Diagram

Figure 8:
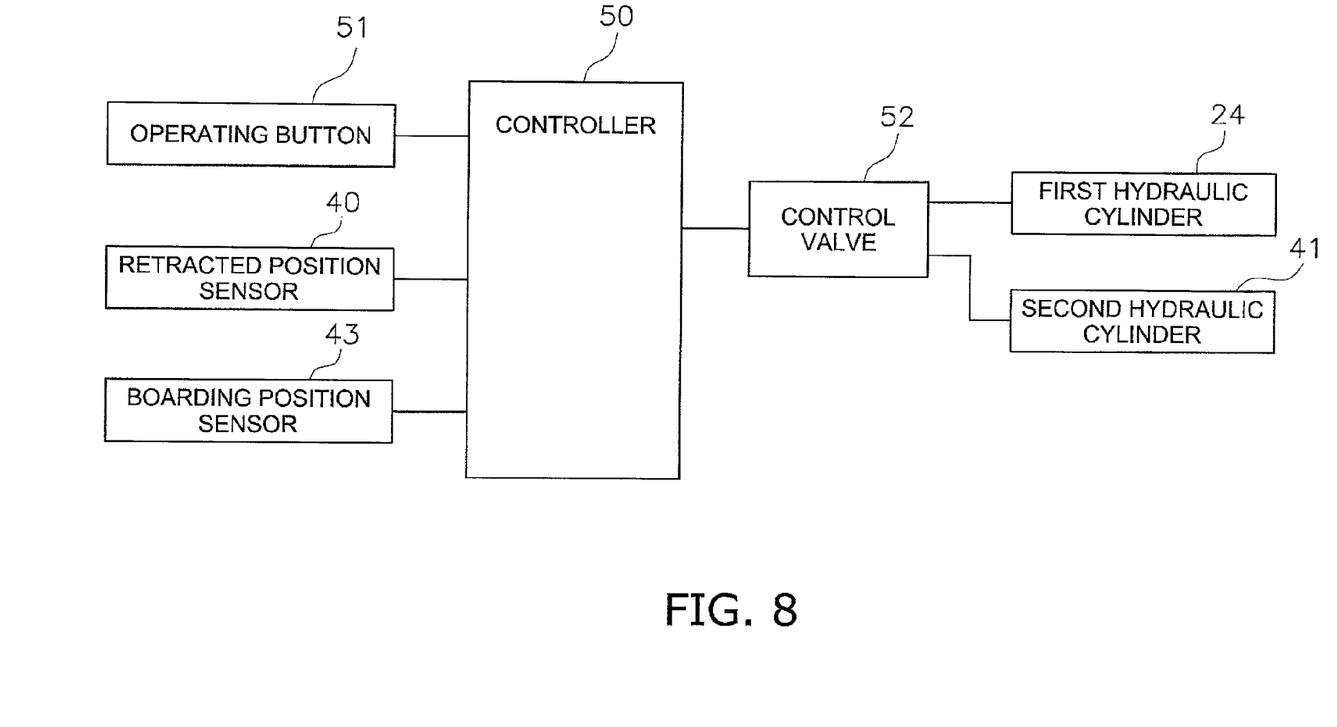
FIG. 8 is a control block diagram of the ladder device.

FIG. 8 represents control blocks regarding the actuation of the ladder device. As represented in the drawing, the bulldozer 1 includes a controller 50. An operating button 51 for actuating the ladder device 7, the retracted posture detection sensor 40 and the boarding posture detection sensor 43 are connected to the controller 50. Further, a control valve 52 for actuating the first hydraulic cylinder 24 and the second hydraulic cylinder 41 is connected to the controller 50.

Actions

When being deployed, the ladder main body 23 is moved to be set in the boarding posture depicted with the solid line in FIG. 1. On the other hand, when travelling or performing a work, the ladder main body 23 is moved to be set in the retracted posture depicted with the dashed two-dotted line.

When being set in the boarding posture, as illustrated in FIG. 2, the ladder main body 23 is disposed between the walkway 15 and the ground while being slanted at the angle α with respect to the horizontal plane H. In the state, the piston rod 24a of the first hydraulic cylinder 24 is retracted. On the other hand, the piston rod 41a of the second hydraulic cylinder 41 is also retracted. Accordingly, the latch 39 of the up-and-down lock mechanism 25 is located in the disengaged position.

When the ladder main body 23 is retracted, the operating button 51 disposed on the ROPS 2a is operated. In response to the operation of the operating button 51, the controller 50 outputs a signal to the control valve 52, and thereby, the first hydraulic cylinder 24 is actuated. Accordingly, the piston rod 24a of the first hydraulic cylinder 24 is protruded, and the rotary bracket 34 of the ladder main body 23 is rotated about the pin 22 in the clockwise direction in FIG. 5. Therefore, the ground-side end portion 302 of the ladder main body 23 is lifted up, and the ladder main body 23 is rotated. When the ladder main body 23 set in the boarding posture is rotated at an angle of 90 degrees, the ladder main body 23 reaches the position corresponding to the retracted posture in a roughly horizontal state. When the ladder main body 23 is rotated to the position corresponding to the retracted posture, the protruded part 45 mounted to the left side plate 30a of the ladder main body 23 is inserted into the recessed portion 46a of the restriction member 46 on the mount frame 21. Accordingly, the ladder main body 23 is restricted from moving right and left.

Further, when the ladder main body 23 has reached the position corresponding to the retracted posture, the retracted posture detection sensor 40 mounted to the mount frame 21 detects that the ladder main body 23 has reached the position corresponding to the retracted posture. In response to the detection result, the controller 50 outputs a signal to the control valve 52. Accordingly, the protruding motion of the piston rod 24a of the first hydraulic cylinder 24 is stopped. On the other hand, the piston rod 41a of the second hydraulic cylinder 41 is protruded, and the latch 39 is rotated about the rotary axis in the counterclockwise direction in FIG. 7. Therefore, the rod 38 of the ladder main body 23 and the latch 39 are engaged such that the latch 39 encloses and holds the rod 38. Therefore, the ladder main body 23 is restricted from moving in the up-and-down direction.

Further, when the ladder main body 23 is moved from the retracted posture to the boarding posture, the operating button 51 disposed on the ROPS 2a outside the cab, is operated. When receiving an instruction from the operating button 51, the controller 50 outputs a signal to the control valve 52 in order to retract the piston rod 41a of the second hydraulic cylinder 41. Accordingly, the latch 39 is rotated in the clockwise direction in FIG. 7, and is disengaged from the rod 38. Thereafter, the controller 50 outputs a signal to the control valve 52 in order to retract the piston rod 24a of the first hydraulic cylinder 24. Accordingly, the rotary bracket 34 on the ladder main body 23 is rotated in the counterclockwise direction. As a result, the ladder main body 23 is rotated in the counterclockwise direction in a side view. When the ladder main body 23 has been rotated at an angle of 90 degrees from the position corresponding to the retracted posture, the boarding posture detection sensor 43 mounted to the mount frame 21 detects that the ladder main body 23 has reached the position corresponding to the boarding posture. In response to the detection result, the controller 50 outputs a signal to the control valve 52. Accordingly, the retracting action of the piston rod 24a of the first hydraulic cylinder 24 is stopped, and the rotational action of the ladder main body 23 is stopped. Thus, the ladder main body 23 is disposed in the boarding posture.

Features (1) When being rotated about the single pin 22 substantially at an angle of 90 degrees in one direction, the ladder main body 23 can be moved between the boarding posture and the retracted posture. Therefore, components including the drive mechanism such as the hydraulic cylinders can be simply structured.

(2) The ladder main body 23 can be rotated between the boarding posture and the retracted posture, while being located adjacently to the vehicle body frame 3 without being separated farther away from the vehicle body. Therefore, the ladder main body 23 can be rotated even in a small space.

(3) With a simple structure, the ladder main body 23 set in the retracted posture can be restricted from moving in the up-and-down direction and the right-and-left direction.

Other Exemplary Embodiments

The present invention is not limited to the exemplary embodiment as described above, and a variety of changes or modifications can be made without departing from the scope of the present invention.

In the aforementioned exemplary embodiment, the hydraulic cylinders are used as the drive mechanism for rotating the ladder main body. However, the components of the drive mechanism are not limited to the above. For example, the drive mechanism may be composed of a motor and a gear mechanism.

In the aforementioned exemplary embodiment, the rotational center axis is structured by disposing the pin 22 on the mount-frame-21 side and by attaching the rotary bracket 34 on the ladder-main-body-23 side onto the pin 22. However, the structure of the rotational center axis is not limited to the above. For example, the rotational center axis may be structured by boring a hole in the mount-frame side and by inserting a shaft fixed to the ladder-main-body side into the hole bored in the mount-frame side.

In the aforementioned exemplary embodiment, all the members composing the ladder device 7 are mounted onto the single mount frame 21. However, the up-and-down lock mechanism 25 and both of the ladder main body 23 and the drive mechanism may be provided separately from each other, and may be respectively attached to the vehicle body frame 3 directly without intervention of the mount frame 21.

According to the movable type ladder device of the illustrated embodiment, a ladder main body can be moved between a boarding posture and a retracted posture in a compact actuation range with a simple structure.

The invention claimed is:

1. A movable type ladder device for a work vehicle for climbing up to and climbing down from a cab mounted to a vehicle body of the work vehicle, the movable type ladder device comprising:
   a movable type ladder main body having a first end portion and a second end portion in a longitudinal direction thereof, the first end portion being rotatably supported with respect to the vehicle body, the ladder main body being configured to be set in a boarding posture and a retracted posture, with the ladder main body being slanted with respect to a horizontal surface while the second end portion is positioned on a ground side in the boarding posture, and the second end portion being lifted up to the same height as the first end portion in the retracted posture;
   a drive mechanism supported by the vehicle body, the drive mechanism being configured to move the ladder main body between the boarding posture and the retracted posture by rotating the ladder main body at an angle of 90 degrees;
   an up-and-down lock mechanism configured to restrict the ladder main body set in the retracted posture from moving in an up-and-down direction with respect to the vehicle body; and
   a mount frame attached to the vehicle body,
   a rotational center axis of the ladder main body being disposed perpendicularly to the longitudinal direction of the ladder main body set in the boarding posture in a front view of the work vehicle, the rotational center axis of the ladder main body being disposed perpendicularly to the longitudinal direction of the ladder main body set in the retracted posture in a plan view of the work vehicle, and
   the ladder main body, the drive mechanism and the up-and-down lock mechanism being mounted onto the vehicle body while being supported by the mount frame,
   the up-and-down lock mechanism including
      a rod mounted to the ladder main body, the rod protruding towards the mount frame;
      a latch mounted to the mount frame, the latch being configured to be set in an engaged position and a disengaged position with the latch being engaged with the rod in the engaged position and the latch being disengaged from the rod in the disengaged position;
      a retracted posture detection sensor configured to detect that the ladder main body has been set in the retracted posture; and
      a latch drive unit mounted to the mount frame, the latch drive unit being configured to move the latch between the engaged position and the disengaged position in accordance with a detection result of the retracted posture detection sensor.

2. The movable type ladder device for a work vehicle recited in claim 1, wherein
   the ladder main body has a pair of side plates and a plurality of steps, the side plates being disposed at a predetermined interval, the steps being disposed between the side plates, and
   the rotational center axis of the ladder main body is positioned further lower than a lower-side one of the side plates in the retracted posture.

3. The movable type ladder device for a work vehicle recited in claim 1, wherein
   the rod is positioned at the same height as the rotational center axis of the ladder main body.

4. The movable type ladder device for a work vehicle recited in claim 1, further comprising
   a right-and-left lock mechanism being configured to restrict the ladder main body set in the retracted posture from moving in a right-and-left direction with respect to the mount frame.

5. The movable type ladder device for a work vehicle recited in claim 4, wherein
   the right-and-left lock device includes:
      a protruded member mounted to the ladder main body, the protruded member protruding upwards from the ladder main body set in the retracted posture; and
      a restriction member mounted to the mount frame, the restriction member being configured to receive the protruded member inserted therein and to restrict the protruded part from moving in the right-and-left direction when the ladder main body is set in the retracted posture.

6. The movable type ladder device for a work vehicle recited in claim 5, wherein
   a rod of the up-and-down lock mechanism is fixed to a lower-side one of a pair of side plates of the ladder main body set in the retracted posture, and
   the protruded member of the right-and-left lock mechanism is fixed to an upper-side one of the side plates of the ladder main body set in the retracted posture.

* * * * *